UNITED STATES PATENT OFFICE.

THOMAS A. HAYNES, OF NEW YORK, N. Y.

PROCESS OF MAKING CASEIN CEMENT.

SPECIFICATION forming part of Letters Patent No. 619,040, dated February 7, 1899.

Application filed February 26, 1898. Serial No. 671,835. (No specimens.)

*To all whom it may concern:*

Be it known that I, THOMAS ALFRED HAYNES, a subject of the Queen of Great Britain, residing at New York, in the county and State of New York, have invented certain new and useful Improvements in Artificial Glue and Size, of which the following is a full, clear, and exact specification.

My invention relates to the production of a glue from skimmed milk, as hereinafter described.

I am aware that many attempts have been made to produce a glue from skimmed milk; but none of such products have been soluble in water. The process which I have invented is entirely distinct from these in that the combination of chemicals I use are used in such a manner as to react on one another and neutralize the natural effect of the lactic acid in the milk, and thus a permanent material is produced. I take any given quantity of skimmed milk and allow the lactic acid to generate, so that it becomes thick. I then heat it to about 140° Fahrenheit for about an hour, stirring it meanwhile, and let the solids in the milk form a hydrate. The liquid is then drawn off and the solids pressed as free from water as possible. I previously have taken a sample of the milk and analyzed it to find the quantity of sugar it contains, and from the result obtained I can estimate the amount of acid that will ultimately be generated in the solid hydrate. I now place the hydrate in a wooden trough, the same as is used by bakers, and knead into it a certain quantity of bicarbonate of soda and also a small quantity of borax. The action of these alkalies will cause the hydrate to rise. I then work it over again and allow it to rest and repeat the operation until the mass has all become slightly sticky and glutinous. This will be accomplished in about two hours. I then put the mass into a clean jacketed kettle fitted with agitators revolving slowly. I now slowly raise the heat to about 170° Fahrenheit, when the mass will have become liquid, but very frothy. I lower the heat now as quickly as possible to about 120° Fahrenheit, when most of the froth will have disappeared. I again raise the heat to about 170° Fahrenheit, and if action of the sodas is not completed froth will again appear. If so, I lower the heat, as before, and again raise it. I continue this heating and cooling until all the gas generated has worked off and the mass is a clear milky liquid. I once more reduce the heat to about 140° and add a small quantity of oil of sassafras or other essential oil. When this is well mixed, the manufacture is completed and the whole can be drawn off either into barrels, where it will set into a thick stiff pasty mass, or it can be drawn off onto plates and dried hard free from moisture.

The quantities of soda and borax used depend upon the amount of sugar in the milk; but I find that ordinarily I get good results by the use of one-half ounce soda bicarbonate and one-fourth ounce of borax to every eight pounds of skimmed milk operated upon. About two pounds of oil of sassafras is used to every ton of finished product made.

The product I thus produce is new in that it dissolves when dry and hard in hot water, such result never having been before obtained, and also from the fact that when made into a size it will not throw a deposit, but will remain a true and clear solution.

When I desire to use the said product as a subsize for paper-making, I add to the product dissolved in water a small quantity of silicate of soda in solution in about the proportions of one-eighth ounce of ordinary commercial liquid silicate of soda to every pound of solid product used in making the size. The result of this addition of silicate of soda to the size is to render it less liable to be curdled by alum, as without its use the alum in the paper is sure to break up the size, causing a deposit and rendering it useless.

Having thus described my invention, I claim—

The herein-described process of making glue or size which consists in the following steps; generating lactic acid in milk, heating the same to form a hydrate, expressing the liquids from the solids of the hydrate, adding an alkali to the hydrate and kneading or working the same, and finally successively varying the temperature until all the gas has worked off.

In testimony that I claim the foregoing I have hereunto set my hand this 18th day of February, 1898.

THOS. A. HAYNES.

Witnesses:
FREDERICK PLATZ,
L. T. SULLIVAN.